UNITED STATES PATENT OFFICE.

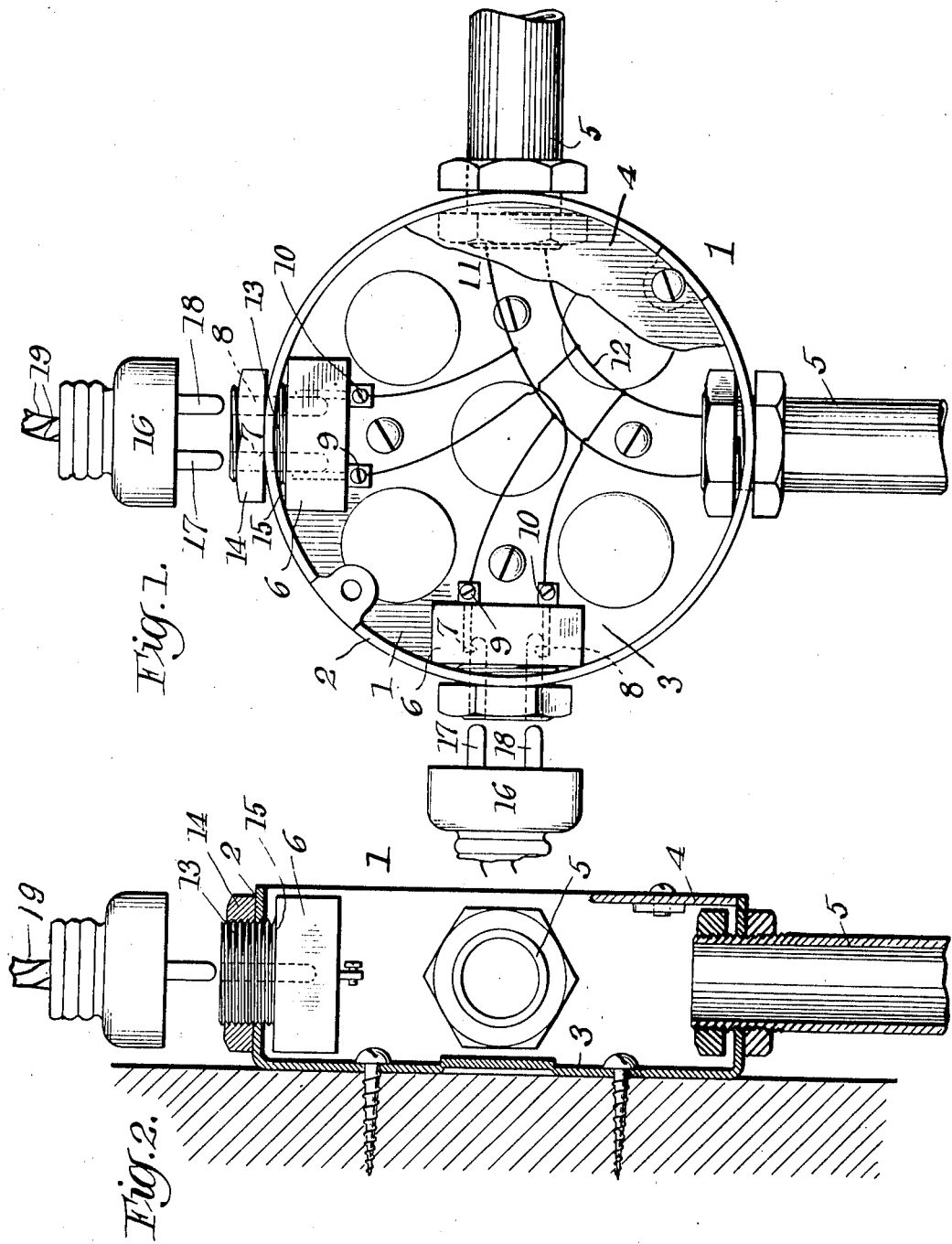

WILLIAM F. MESCHENMOSER, OF NEW DORP, NEW YORK.

OUTLET-BOX FITTING.

1,314,346.  Specification of Letters Patent.  Patented Aug. 26, 1919.

Application filed July 8, 1915. Serial No. 38,756.

*To all whom it may concern:*

Be it known that I, WILLIAM F. MESCHENMOSER, a citizen of the United States, and a resident of New Dorp, in the county of Richmond and State of New York, have invented certain new and useful Improvements in Outlet-Box Fittings, of which the following is a specification.

My invention relates to outlet or junction boxes and has for its object the production of an electrical fitting adapted to be detachably fastened in a knockout hole of the outlet or junction box whereby a detachable connection may be established between the wire mains leading into the box and any lamp or machine requiring current.

Other and further objects and advantages of the invention will appear from the accompanying description, the invention consisting in the novel parts and combinations of parts hereinafter more particularly described and then specified in the claims.

Where an exposed conduit is employed in electrical installation, outlet boxes frequently form the supports for pendant fixtures, such as lighting fixtures arranged above machines or the like. In the installation of such a fixture the connection to the wire mains is usually made by soldering the branch wires to the mains within the outlet box. It frequently happens that these fixtures have to be changed in which case it is necessary to break the soldered connection within the outlet box and to establish a like connection with the branch wires of the substituted fixture. These operations are difficult to perform and time-consuming and therefore objectionable. Furthermore, it has heretofore been necessary to delay the wiring installation in a new building until the machinery is in place, in order that the outlet box and its pendant fixture may be properly located with relation to the machinery which delays the completion of the building.

The objections hereinbefore enumerated are obviated by means of my invention which permits the wiring installation in a building to be completed at any suitable time during its construction and before the machinery is placed in position. The invention also permits connections being made with the wire mains in the outlet box of additional electric fans or lighting fixtures at any time.

In the accompanying drawing showing a practical embodiment of my invention:

Figure 1 is a front elevation of an outlet box showing two of my improved fittings detachably fastened thereto.

Fig. 2 is a transverse central section through the same, parts being shown in elevation.

Referring more particularly to the drawing:

1 indicates a metallic outlet, junction, pull, panel or other style box to which the ends of conduit pipes 5 are secured in the usual manner. The outlet box 1 comprises a casing having an annular side wall 2, base 3 and removable cover 4. It is a standard article on the market and is customarily supplied with a plurality of depressions in the wall, base or cover thereof of such size and character that the material in the bottom of the depression can be knocked out to form an opening or what is commonly known as a "knock-out" of a proper size permitting the insertion of the end of a standard size conduit. A plurality of these depressions, to afford a plurality of knock-out holes, are provided at spaced and various intervals so that any desired arrangement of emanating pipes may be obtained. It is seldom that all the knock-out holes are employed for pipe lines, the outlet box in the present case being shown with two of the knock-outs provided with the conduit pipes 5.

My improved fitting as herein shown comprises preferably a rectangular-shaped insulating body 6 provided with suitable jack-receiving terminals or contact sockets 7, 8 having binding posts 9, 10 connected therewith. The said binding posts 9, 10 are so arranged as to extend substantially parallel to the base 3 and cover 4 of the outlet box and the screws for the binding posts are tapped therethrough in a direction such as to make them readily accessible when it is desired to connect the binding posts with the wire mains 11, 12 which run through the conduits 5. As is obvious, when this connection is made, current is fed to the jack-receiving terminals 7 and 8 of the insulating body 6.

The said insulating body is provided with a screw-threaded boss or extension 13 of a size permitting it to be readily inserted in and to project through any desired knockout hole of the outlet box and as is illustrated. The projecting end of the boss is provided with a lock nut 14 which coöperates with a shoulder 15 on the insulating body 6 and which firmly and removably clamps the fitting to the junction box.

16 indicates a conventional form of detachable plug provided with suitable jacks or projecting contact pins 17, 18 which are adapted to enter or be received by the jack-receiving terminals 7 and 8 and to make electrical connection therewith. The plug 16 is provided with the usual flexible wires 19 which may be run to any desired point for operating a light, fan or for other purposes.

As is obvious, my improved fitting is so constructed as to permit it to be expeditiously and easily mounted in any of the knock-out holes of the outlet box and to be readily connected with the wire mains thereof. Also, as many fittings as there are knock-outs in the outlet box may be mounted therein so as to permit current to be supplied to numerous fans or lights at different locations. At any convenient time during the erection of a building the conduit installation and the outlet boxes with my improved fittings therein may be installed and lights connected with the outlet box through the fittings whenever necessity arises.

What I claim as my invention is:—

1. An outlet box fitting comprising a relatively shallow insulating body fitting against a side wall of the outlet box and having a boss projecting through an aperture in said side wall, means engaging said boss exterior to the box to hold the fitting in position, jack-receiving terminals arranged in said boss and accessible to the jacks of a coöperating attachment plug exterior to the box, and wire terminals on the body of the fitting within the box and electrically connected to said jack-receiving terminals.

2. An outlet box fitting comprising an insulating body fitting against a side wall of the outlet box, wire terminal plates projecting from the inner face of said body in a direction substantially parallel to the bottom of the box, binding screws projecting through said terminal plates toward the bottom of the box for connection to lead wires within the box, jack-receiving terminals carried by said body and arranged in register with an aperture in the wall of the box against which the body rests, and means for securing said body in position within the box.

3. An outlet box fitting comprising a relatively shallow insulating body fitting against a perforated side wall of the outlet box and having a boss projecting through said aperture, means exterior to the box engaging said boss to hold the fitting in position, wire terminal plates projecting from the inner face of said body substantially parallel to the bottom of the box, jack-receiving terminals arranged in said boss and accessible to the jacks of a coöperating attachment plug exterior to the box, said jack-receiving terminals and wire terminals being electrically connected.

Signed at New York, in the county of New York and State of New York, this 7th day of July, A. D. 1915.

WILLIAM F. MESCHENMOSER.

Witnesses:
W. R. WARNER,
F. B. TOWNSEND.